United States Patent [19]
Mazuryk

[11] Patent Number: 6,164,970
[45] Date of Patent: Dec. 26, 2000

[54] SELECTIVELY TRANSPARENT MAP

[76] Inventor: Sergiy Mazuryk, 269 S. Beverly Dr., Suite 606, Beverly Hills, Calif. 90212

[21] Appl. No.: 09/054,034

[22] Filed: Apr. 2, 1998

[51] Int. Cl.[7] .................................................. G09B 29/00
[52] U.S. Cl. .............................. 434/150; 349/66; 40/661; 434/153
[58] Field of Search .................................. 434/150, 370, 434/303, 153; 359/613, 595, 596; 40/426, 453, 454, 661, 994; 52/473; 349/66, 57, 62, 65

[56] References Cited

U.S. PATENT DOCUMENTS

| | | | |
|---|---|---|---|
| 2,761,413 | 9/1956 | Breer | 116/204 |
| 3,582,189 | 6/1971 | Moritz | 359/613 |
| 3,647,279 | 3/1972 | Sharpless | 349/23 |
| 3,653,138 | 4/1972 | Cooper | 40/453 |
| 3,849,913 | 11/1974 | Williams | 434/150 |
| 3,924,879 | 12/1975 | Wright | 462/66 |
| 3,940,896 | 3/1976 | Steel | 40/426 |
| 4,505,061 | 3/1985 | Neuberger | 40/489 |
| 4,688,156 | 8/1987 | Suzuki | 362/354 |
| 4,709,988 | 12/1987 | Kai | 359/613 |
| 4,800,662 | 1/1989 | Belrose | 40/426 |
| 4,998,752 | 3/1991 | Judson | 283/34 |
| 5,147,716 | 9/1992 | Bellus | 428/323 |
| 5,313,335 | 5/1994 | Gray | 359/839 |
| 5,496,176 | 3/1996 | Swanson | 434/154 |
| 5,549,332 | 8/1996 | Judson | 283/34 |
| 5,647,156 | 7/1997 | Hull | 40/661 |
| 5,671,028 | 9/1997 | Okano | 349/66 |
| 5,695,415 | 12/1997 | Docherty | 310/89 |

FOREIGN PATENT DOCUMENTS

| | | | |
|---|---|---|---|
| 3717462 | 1/1988 | Germany | 434/150 |
| 2263995 | 11/1993 | United Kingdom | 434/150 |

*Primary Examiner*—Jacob K. Ackun
*Assistant Examiner*—Kent Fernstrom
*Attorney, Agent, or Firm*—Goldstein & Canino

[57] ABSTRACT

A selectively transparent map system, for use by a driver in an automobile having an automobile windshield, comprising a map having map indicia printed thereupon. The map is selectively transparent so that when the map is held against the windshield in front of the driver, and the map is viewed at a first angle, the driver can read the map indicia while simultaneously watching the road by looking directly through the map. However, when the map is viewed at a second angle, the driver can read the map indicia, but cannot see through the map. The map thus includes a selective transparency means which preferably includes a grating having a plurality of blocking members which allow light and images to be easily transmitted through the map at the first angle, but substantially block light from being transmitted through the map at the second angle.

9 Claims, 5 Drawing Sheets

SELECTIVELY TRANSPARENT MAP

BACKGROUND OF THE INVENTION

The invention relates to a map. More particularly, the invention relates a map that is substantially transparent when viewed from a first angle, but is substantially opaque when viewed from a second angle.

When in unfamiliar territory a map can make the difference between being hopelessly lost, and knowing precisely how to reach the desired destination. However, even if a map is available, it is not always possible to use the map when it is most needed.

Reading a map typically requires that the driver take his eyes off the road. This can be quite dangerous while driving. Averting one's eyes from the road for even a split second can easily lead to an accident. Often when drivers look down at a map, they have a tendency to swerve their vehicles, and even leave their lane of travel. Thus, it is the preferred practice to pull off the road and stop the car before looking at a map.

However, it is not always possible to stop the car to look at a map. When on the highway, a shoulder is not always available for stopping. Especially in metropolitan areas, one can easily pass several highway interchanges, becoming even more lost, before encountering a location to safely pull off the road. Further, when lost in an apparently dangerous neighborhood, it is highly undesirable to stop the car—for any reason.

In recent years systems have been proposed which provide computerized displays of the driver's location and surrounding roads and landmarks. However, these systems are expensive, and require installation. Further, these devices still require that the driver take his eyes off the road in order to use them.

While these units may be suitable for the particular purpose employed, or for general use, they would not be as suitable for the purposes of the present invention as disclosed hereafter.

SUMMARY OF THE INVENTION

It is an object of the invention to produce a map which is selectively transparent, so that it may be held in front of an automobile windshield by a driver, and read without obscuring the driver's view of the road.

It is another object of the invention to provide a map which is also selectively opaque so that the map may be easily viewed with reflected light in low ambient light conditions. Accordingly, structure is present which allows light and images to easily pass through the map from a first angle, but will block light from traveling through the map at a second angle. Accordingly a grating is provided which allows transmission of light at certain angles, but blocks the light at other angles. Preferably, the grating is arranged so that it allows light to be transmitted perpendicular to the map, but blocks light from traveling through the map at a diagonal angle.

It is a further object of the invention that magnetic markers may be employed to mark the driver's location or destination. Accordingly, the map may comprise a transparent upper layer, and a lower base. The lower base may include a metallic grating which provides the desired selective light transmissive properties, and which also allows magnetic attraction from the markers. The base is further preferably stiff, so as to keep the map readable while holding it vertically before the windshield with one hand.

It is a yet a further object of the invention that the map may comprise several separable transparent layers, so that one layer shows major highways, and additional layers show local roads, landmarks, and further geographic features. Thus, the layers can be selectively overlaid to view only that information which is needed, while eliminating the clutter of having all information present at once.

It is a still further object of the invention that the map may comprise adjacent transparent, selectively transparent, and non-transparent sections. Thus, the same map information is available at different locations of the map, so that the driver can view the portion which is most comfortable to read under the circumstances.

The invention is a selectively transparent map system, for use by a driver in an automobile having an automobile windshield, comprising a map having map indicia printed thereupon. The map is selectively transparent so that when the map is held against the windshield in front of the driver, and the map is viewed at a first angle, the driver can read the map indicia while simultaneously watching the road by looking directly through the map. However, when the map is viewed at a second angle, the driver can read the map indicia, but cannot see through the map. The map thus includes a selective transparency means which preferably includes a grating having a plurality of blocking members which allow light and images to be easily transmitted through the map at the first angle, but substantially block light from being transmitted through the map at the second angle.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
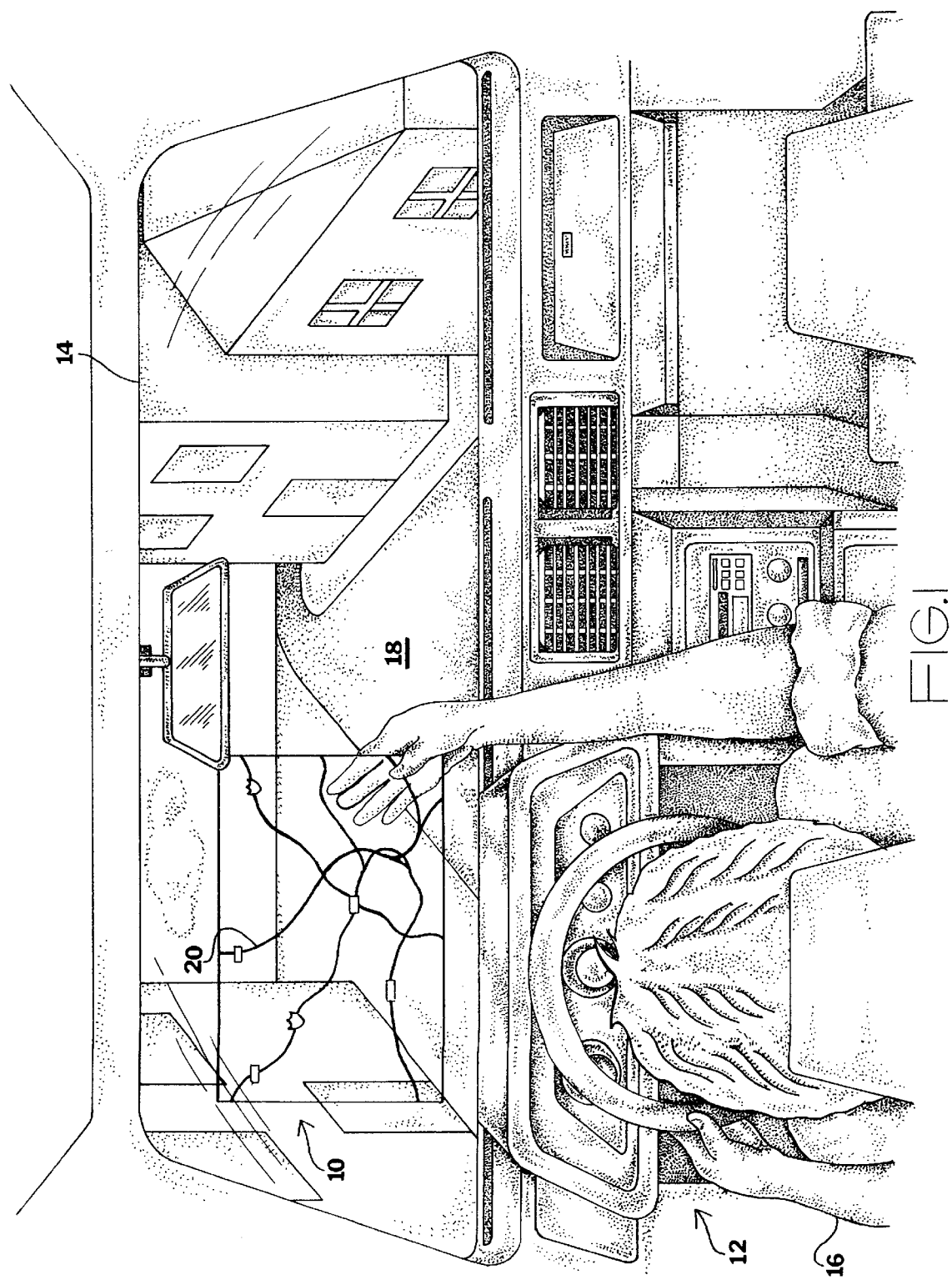
FIG. 1 is a diagrammatic perspective view, illustrating an embodiment of the invention in use in an automobile, wherein the map is held against the automobile windshield directly in front of the driver and the driver views the map at a first angle, wherein the driver can read indicia on the map, and can also view the road by looking through the map.

FIG. 1 illustrates a map 10, intended primarily for use within an automobile 12 having a windshield 14, being operated by a driver 16 upon a road 18. The map 10 has indicia 20 which indicates major roads, local roads, landmarks and other items of geographic significance. The driver is viewing the map at a first viewing angle of approximately ninety degrees, wherein the map 10 is held against the windshield directly in front of the driver 16. According to the present invention, the driver 16 can not only read the indicia 20 printed upon the map 10, but can also view the road 18 by looking through the map 10.

Accordingly, several advantages of the map's use are immediately apparent. First, since the driver 16 can simultaneously read the map 10 and view the road 18, the driver 16 need not stop the automobile 12 in order to read the map 10. Second, the driver 16 can easily view the map 10 while stopped at a traffic light, and instantly know when the light changes color without averting his eyes from the map indicia 20, and can resume motion immediately. Third, the driver can easily compare street names, highway names, and names of landmarks between the map indicia 20 and street signs by holding the map 10 toward the sign and looking through the map 10, simultaneously viewing the map indicia 20 and street sign. Further advantages of the map's use will become apparent during the following discussion.

Figure 2:
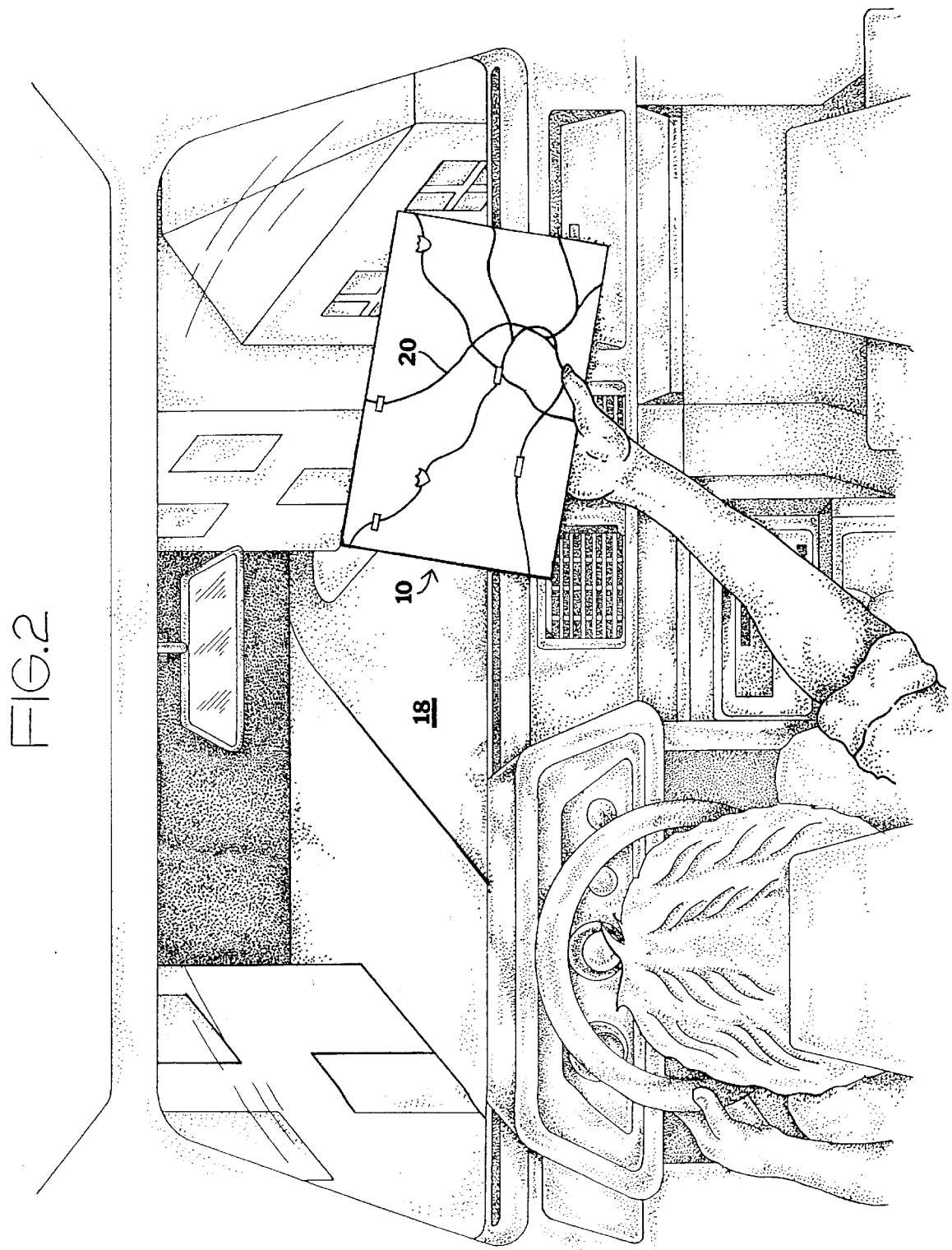
FIG. 2 is a diagrammatic perspective view, illustrating the invention is use, wherein the map is held to the side, and is thus viewed from a second angle, wherein the map indicia is readable, but the driver cannot see the road through the map.

In FIG. 2, the map 10 is held so that it is viewed at a second viewing angle, which is approximately forty-five degrees to its surface. When viewed at this second viewing angle, the map indicia 20 is still visible. However the road 18 cannot be viewed at this second angle. In other words, when viewed at the second viewing angle, the map 10 becomes substantially opaque.

Accordingly, at night it would be difficult the view the map if it were strictly transparent. However, according to the present invention, the map is also selectively opaque. Thus, it is possible to view the map in low ambient light, with reflected light from a dome light in the automobile.

Thus, the invention is structured so to take full advantage of its transparency when a large amount of ambient light is present, yet is selectively opaque so as to also be fully usable when ambient light is at a minimum. A variety of different map structures may be used to meet these goals.

Figure 3:
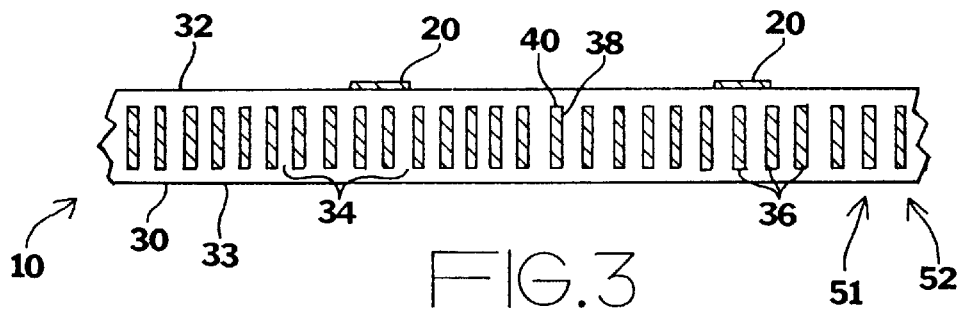
FIG. 3 is a cross sectional view, illustrating the grating within the transparent carrier for selectively blocking light or transmitting light through the map.

The structure of the embodiment illustrated in FIG. 1 and FIG. 2 is further detailed with a greatly enlarged cross section in FIG. 3. The map 10 has a transparent carrier 30 having a top surface 32 and a bottom surface 33. The top surface 32 has the map indicia 20 printed thereupon.

By a preferred embodiment, within the map is a grating 34, which may comprise a plurality of blocking members 36, each having a height 38 and a thickness 40. The height 38 of each of the blocking member 36 is several times greater than the thickness 40 thereof. The blocking members are arranged vertically, and are uniformly spaced across the map 10.

Light incident upon the map 10 at a first angle of incidence 51 will be transmitted through the grating 34, and thus through the map. Note that the first angle of incidence 51 is substantially parallel to the blocking members. Light incident upon the map 10 at a second angle of incidence 52 will be blocked by the blocking members 36 of the grating 34. As incident light upon the map 10 is varied between the first angle of incidence and the second angle of incidence, light will be transmitted through the map in decreasing amounts. Conversely, when the map is viewed at the first angle as illustrated in FIG. 1, which is equivalent to the first angle of incidence, the map is substantially transparent. However, when the map is viewed at the second angle as illustrated in FIG. 2, which is equivalent to the second angle of incidence, the map is substantially opaque.

The first incidence angle 51 and second incidence angle 52 can be altered by angling the blocking members 36 themselves. For example, if the blocking members 36 are angled by ten degrees from a normal line to the top surface 32, then the optimal viewing angle will be ten degrees from the normal line. Thus the optimal viewing angle can be adjusted after empirical study to determine the most comfortable angle for viewing the map 10 while driving.

Figure 4:
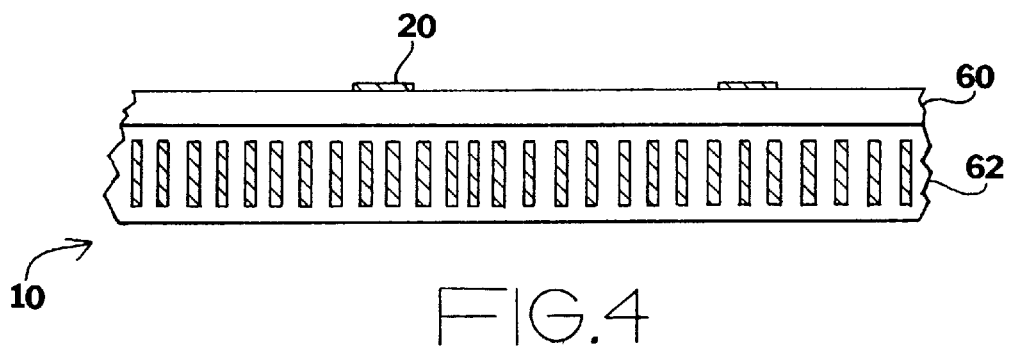
FIG. 4 is a cross sectional view, illustrating another embodiment of the invention having separate base and transparent sections, wherein the grating is located within the base.

Referring to FIG. 4, the map can be configured with a bi-partite construction, wherein the map 10 comprises a transparent sheet 60 and a selectively transparent base 62. Accordingly, the map indicia 20 is printed on the transparent sheet 60, and the grating 34 is contained within the base 62. According to this manner of construction, the base 62 can be a substantially rigid so the map 10 can be easily held with one hand while driving, while the transparent sheet 60 is simply an ordinary acetate sheet having the map indicia.

The transparent sheet 60 and selectively transparent base 62 may be permanently laminated to each other, or they may be selectively detachable. If they are detachable, then the base 62 acts as a filter for providing the desired selective transparency properties according to the goals of the present invention. Further, the transparent sheet 60 can be easily interchanged with other transparent sheets 60 having different map indicia 20 printed thereupon. Thus an atlas of thin sheet transparent maps can be easily contained in a box, wherein the desired map is removed from the box when needed, temporarily attached to the base, and used as previously described.

Figure 5:
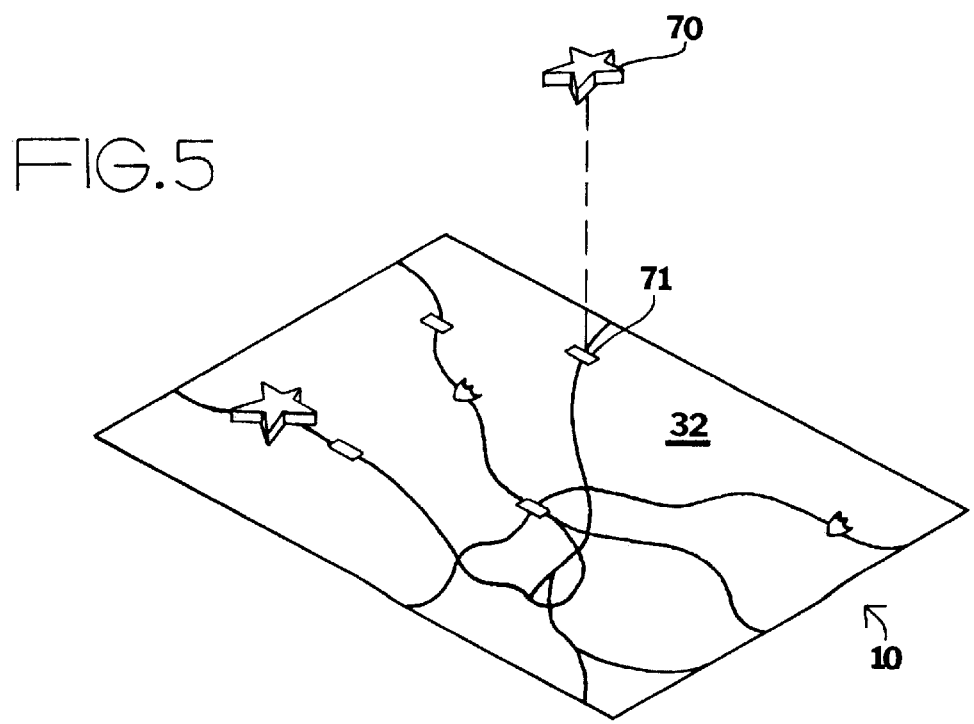
FIG. 5 is a diagrammatic perspective view illustrating how magnetic markers can be used in conjunction with the present invention.

Referring to FIG. 5, magnetic markers 70 may be used in conjunction with the map 10. If the grating 34 comprises metallic components, the magnetic marker 70 can be adhered to any spot on the top surface 32 of the map 10. As illustrated in FIG. 5, the magnetic marker 70 is shaped like a star, and is about to be adhered to the top surface and used to designate a destination 71 on the map indicia 20.

Figure 6:
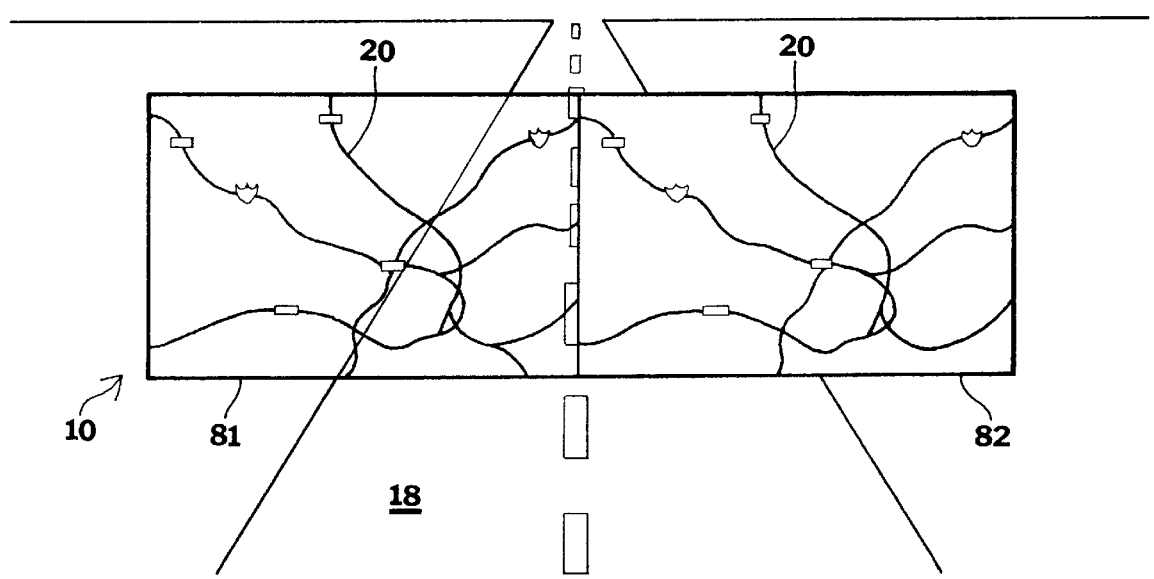
FIG. 6 is a diagrammatic perspective view, illustrating another embodiment of the invention, wherein the map has distinct transparent and opaque sections located adjacent to one another and having the same map indicia duplicated thereupon.

FIG. 6 illustrates another embodiment of the map, which accomplishes the goals of the invention: presenting the map indicia 20 on both a transparent and an opaque carrier. However, in this embodiment, the map 10 comprises a first section 81 and a second section 82. The first section 81 and second section 82 are located adjacent to one another. The first section is transparent, and has the map indicia 20 printed thereupon. The second section 82 is opaque, and has the same map indicia 20 duplicated thereupon. Thus, when one wishes to use the map in a transparent fashion, one can view the first section 81, and also view the road 18 at the same time. Alternatively, if one wishes to use the map in an opaque fashion, one can view the second section 82, but cannot see the road 18 through the second section 82. The second section is then preferably an ordinary paper or plastic laminated paper map.

In addition, within the spirit of the embodiment illustrated in FIG. 6, several different sections can be located adjacent to one another. These sections can include transparent sections, opaque sections, and selectively transparent sections as previously described.

Figure 7:
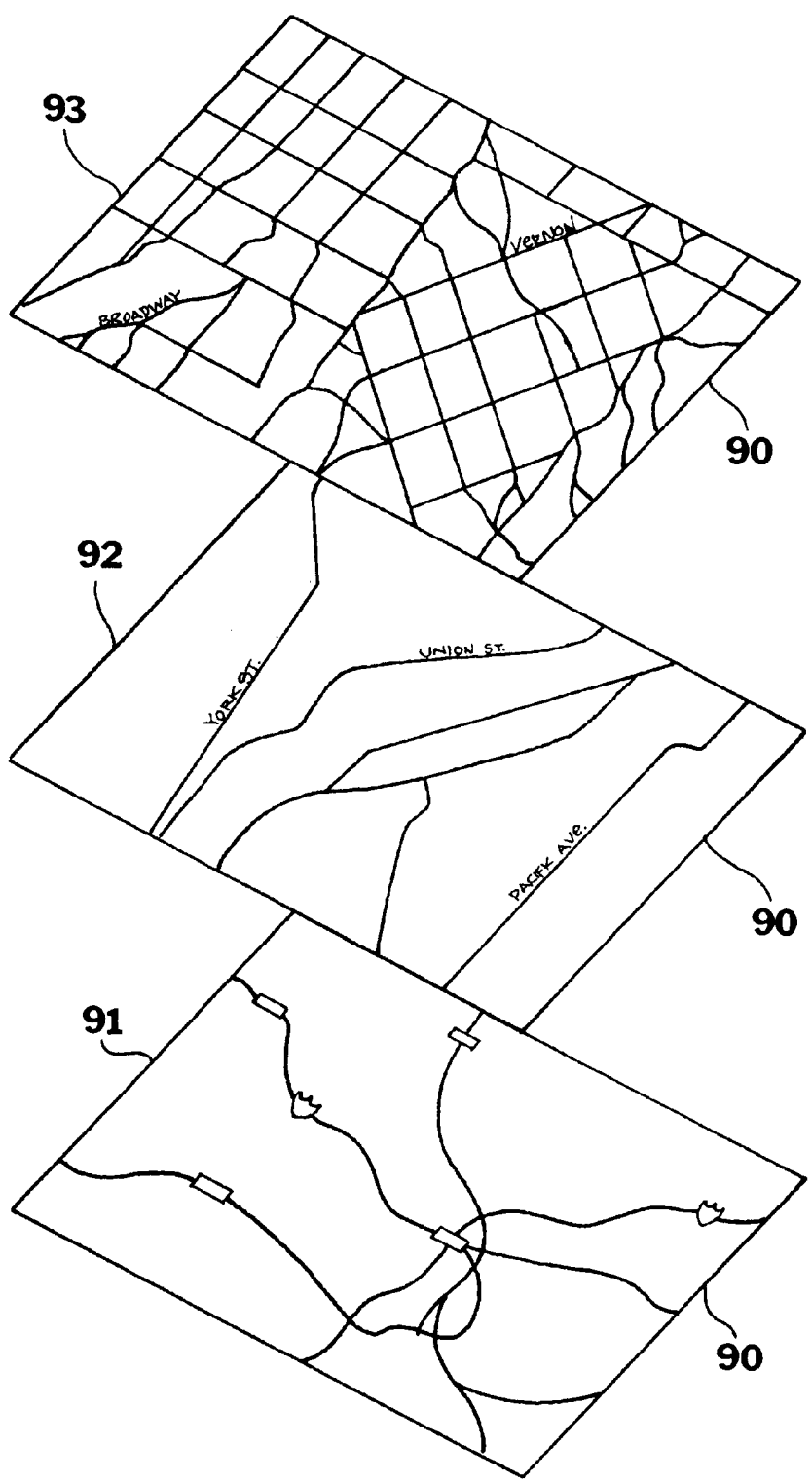
FIG. 7 is a diagrammatic perspective view, illustrating another embodiment of the invention, wherein a plurality of transparent layers each have different information corresponding to the same geographic area, and wherein the layers are selectively overlaid to provide only that information which is necessary to the driver.

FIG. 7 illustrates another embodiment, following the inventive concept, wherein the map 10 may comprise a plurality of map layers 90, each map layer includes different information which corresponds to the same geographic location. These maps may be combined in different combinations to give the driver the information that is necessary, and to eliminate clutter from unnecessary information.

In FIG. 7, three layers, including a first layer 91, second layer 92, and a third layer 93 is disclosed. In this example, the first layer 91 illustrates interstate highways, the second layer 92 illustrates main roads, and the third layer 93 indicates local streets. Additional layers can provide other information, such as location names, topographical contours, political boundaries, etc.

In conclusion, herein is presented a map which is selectively transparent, having map indicia printed thereupon. The map is transparent when viewed from a first angle, so that a driver can hold the map against the automobile windshield, and read the map indicia without taking his eyes off the road. However, the map is also opaque when viewed from a second angle, so that the map may be easily viewed in low light environments.

What is claimed is:

1. A map, comprising:
   a transparent carrier having a top surface and a bottom surface;
   a map printed upon the top surface; and
   a selective transparency means which allows light to travel through the map between the top surface and bottom surface at a first angle, but does not allow light to travel through the map between the top surface and bottom surface at a second angle.

2. The map as recited in claim 1, wherein at least a transparent portion of the map may be viewed so that the viewer can read the map indicia and also see objects through the map, and at least an opaque portion of the map may be viewed so that the viewer can only read the map indicia but cannot see objects through the map.

3. The map as recited in claim 2, wherein the selective transparency means includes a grating, the grating comprising a plurality of blocking members that are evenly spaced across the selectively transparent section of the map.

4. The map as recited in claim 3, wherein the grating further comprises a plurality of blocking members, the blocking members have a thickness and a height, the height of each of the blocking members is several times the thickness thereof.

5. The map as recited in claim 4, wherein the grating has metallic components, and the map further comprising magnetic markers, for selectively adhering to the top surface to designate a particular location on the map indicia.

6. The map as recited in claim 5, further comprising a base, the transparent carrier located on top of the base, the grating located within the base.

7. The map as recited in claim 6, wherein the base and transparent carrier are selectively detachable, so that transparent carriers having different map indicia can be easily interchanged using the same base.

8. The map as recited in claim 7, wherein the map comprises a plurality of transparent layers, each layer having different information which corresponds to the same geographic area, the maps are selectively overlaid in different combinations to provide needed information while eliminating clutter associated with providing all information for a geographic location simultaneously.

9. The map as recited in claim 2, wherein the map comprises a first section and a second section located laterally adjacent to each other, the first section is the transparent section, and the second section is the opaque section.

* * * * *